July 29, 1958 J. C. HOLLIS 2,845,312
MOUNT FOR MACHINE TOOL WORK SUPPORT
Filed July 28, 1954 2 Sheets-Sheet 1

Inventor
John C. Hollis
Carlson, Pitzner, Hubbard & Wolfe
Att'ys

July 29, 1958  J. C. HOLLIS  2,845,312
MOUNT FOR MACHINE TOOL WORK SUPPORT
Filed July 28, 1954  2 Sheets-Sheet 2

Inventor
John C. Hollis
Carlson, Pitzner, Hubbard & Wolfe
Atty's

United States Patent Office 2,845,312
Patented July 29, 1958

2,845,312

MOUNT FOR MACHINE TOOL WORK SUPPORT

John C. Hollis, Fond du Lac, Wis., assignor to Giddings & Lewis Machine Tool Company, Fond du Lac, Wis., a corporation of Wisconsin Application July 28, 1954, Serial No. 446,196

6 Claims. (Cl. 308—227)

The present invention has to do with machine tools, and, more particularly, relates to journal mounts for machine tool work supports which are rotatable about a vertical axis. The table or chuck of a vertical turret lathe is one example of such a work support.

It is the general aim of the invention to provide a novel anti-friction mount for a rotatable work support of the foregoing type which not only sustains heavy loads but successfully prevents rocking of the work support under the cutting forces exerted by a tool acting at the outer radius of a supported workpiece.

Another object of the invention is to provide such a mount for a work support in which the bearing elements may be preassembled, adjusted, and repaired as a separate unit, such unit being easily and quickly installed on or removed from the base of the machine.

It is a further object of the invention to provide a mount for a work support in which thermally induced expansion of parts adjacent bearings, arising from heat generated by friction in the bearings, does not result in warping or distortion of the work support nor consequent inaccuracies in the workpiece being machined.

Still another object of the invention is the provision of such a mount in which the weight or load of the work support and workpiece are borne by direct transfer of forces to the footing of the machine base, bending movements in the base structure being substantially eliminated.

Figure 1:
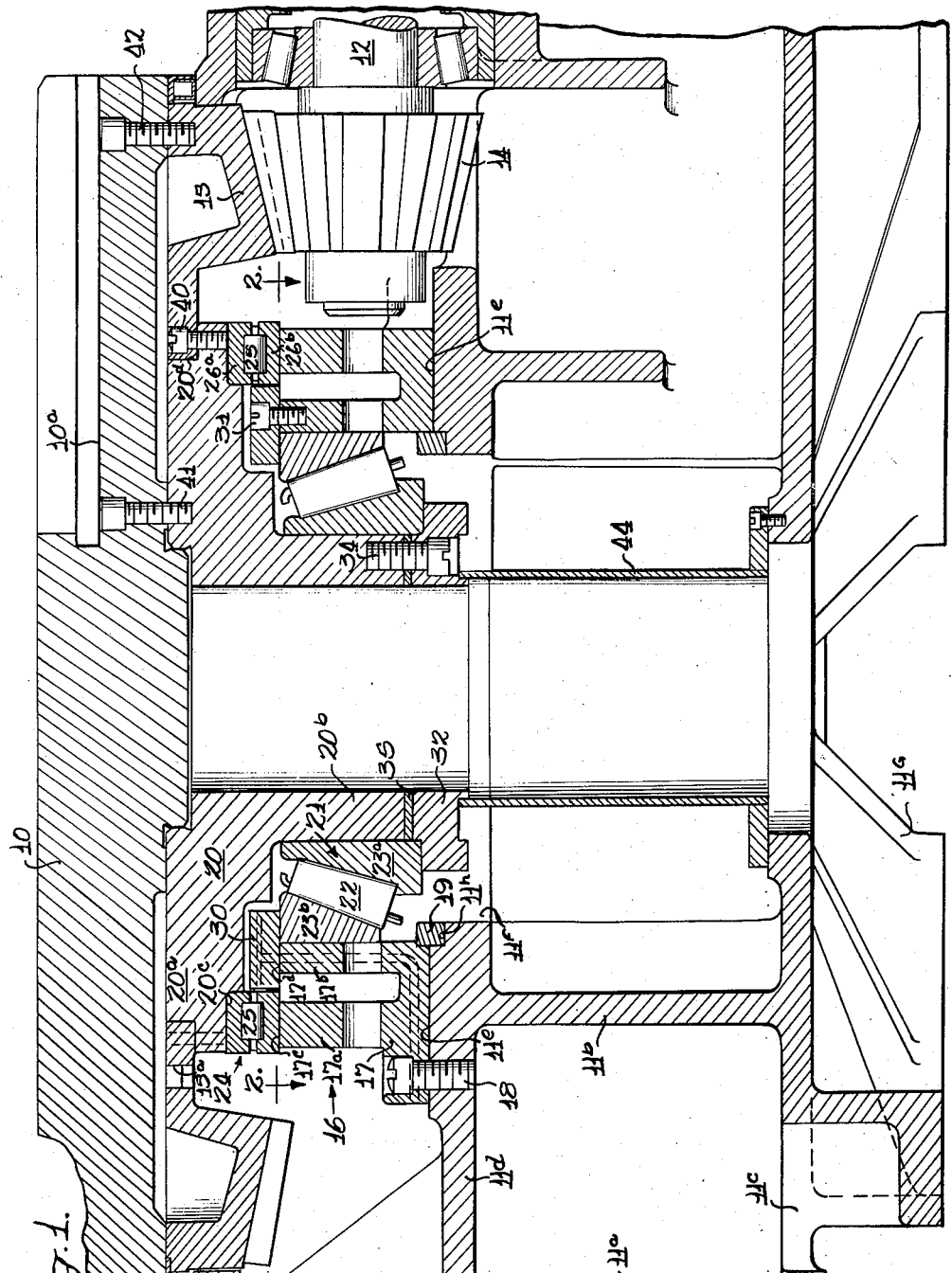
Figure 2:
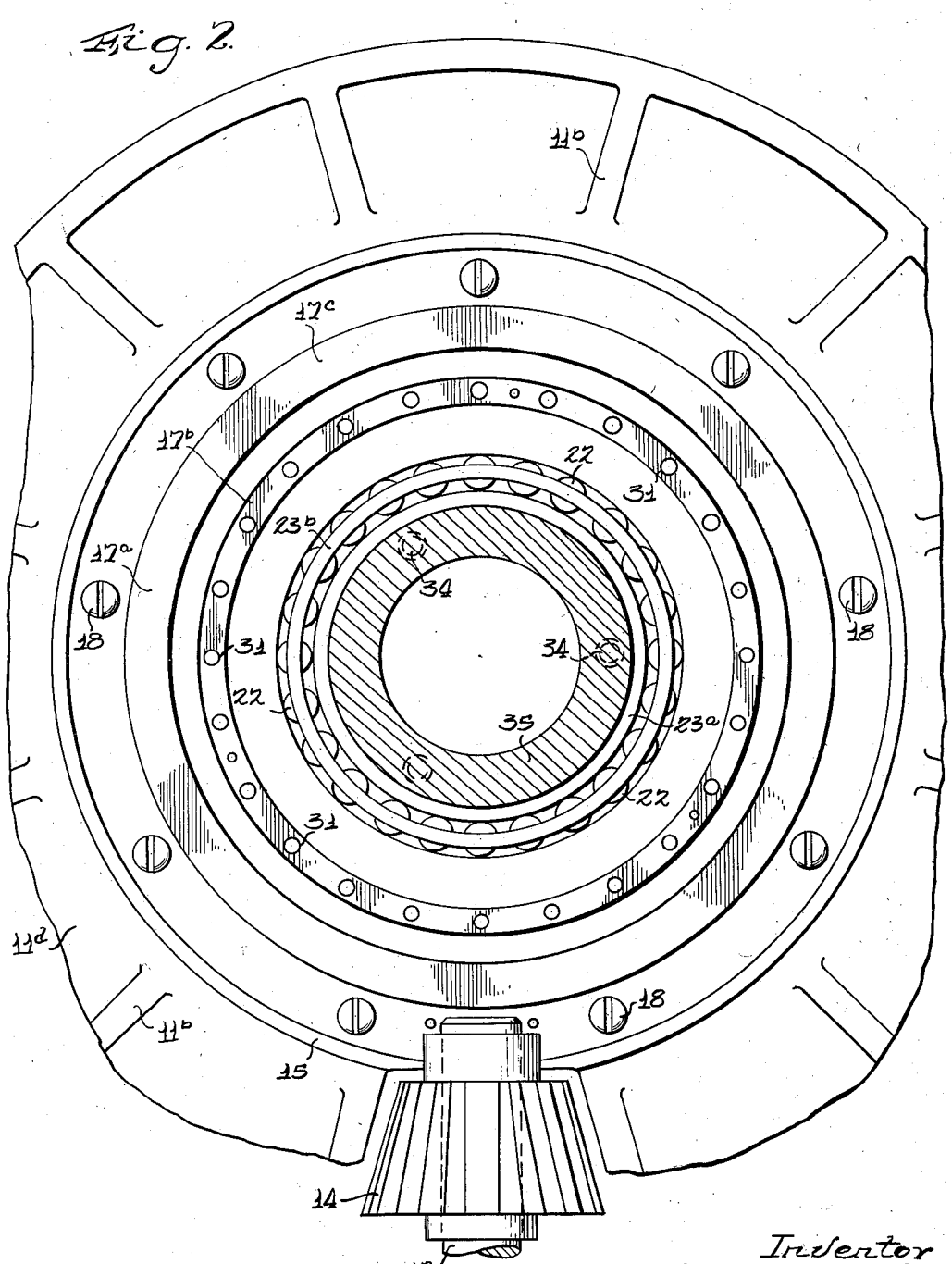

Other objects and advantages will become apparent as the following description proceeds, taken in conjunction with the accompanying drawings, in which:

Figure 1 is a vertical cross section of an anti-friction mount for the work support of a machine tool, such mount being a preferred embodiment of the invention; and Fig. 2 is a fragmentary horizontal section taken substantially along the line 2—2 in Fig. 1.

While the invention has been shown and is described in some detail with reference to a particular embodiment thereof, there is no intention that it thus be limited to such detail. On the contrary, it is intended here to cover all alterations, modifications and equivalents falling within the spirit and scope of the invention as defined in the appended claims.

Referring to the drawings, the work support mount here illustrated by way of example, is applied in rotatably mounting a work table 10 on a base 11 of a machine tool such as a vertical turret lathe, the remaining parts of the lathe being omitted from the drawings. It may be noted that the machine tool includes a drive shaft 12 (partially shown) carrying a pinion 14 which, acting on a ring gear 15 serves to rotate the table 10. In accordance with the invention, there is interposed between the table 10 and the base 11 a bearing unit 16 capable of preassembly and adjustment and subsequent quick and convenient installation or removal, as will appear more fully below.

As shown in this instance, the base 11, which may be a one-piece casting, includes an upright outer circular wall 11a and a concentric annular upright partition 11b. The wall and partition are connected by a horizontal web 11c at their lower ends and by a similar web 11d extending between the midportion of the outer wall and the upper end of the partition 11b. For accurately locating and supporting the bearing unit 16, the partition 11b terminates at its upper end in a broad horizontal surface 11e which may be accurately machined by a simple turning operation. The partition 11b is also turned radially inward near its upper end to define a central, circular opening 11f. Connected with the lower part of the web 11c is a downwardly extending footing structure 11g which rests on the floor and supports the entire base.

The bearing unit 16, in accordance with the invention, is adapted to be seated and supported on the base surface 11e, being removably secured in place and capable of quick installation or removal. To this end, the unit 16 includes a stationary foundation ring 17 having an outer flange through which a plurality of circularly spaced machine screws 18 are passed into threaded engagement with the web 11d, thus holding the ring 17 in place on the surface 11e. The ring 17 may be accurately located in place prior to insertion of the bolts 18 through the provision of a ring insert 19 placed in a counterbore 11h and extending upwardly to engage the inner surface of the ring 17. The ring 17 further includes inner and outer annular, concentric, walls 17a and 17b which extend vertically upward, define a deep annular groove therebetween, and terminate in respective horizontal surfaces 17c and 17d. These latter surfaces may be coplanar and accurately machined to be perfectly horizontal by a single turning operation. Since together they locate the two bearings employed, the arrangement is thus considerably simplified.

As a supporting element for the table 10, or other work support, a sub-table 20 is provided and rotatably supported from the ring 17 in a manner which accommodates a considerable weight load yet which maintains the table alined on the desired axis of rotation even under the forces of a cutting tool on a workpiece and even though heat generated in the preloaded bearings tends to cause physical expansion of metal parts. The sub-table 20 as shown in this instance, includes a horizontal radial flange portion 20a having a central depending hollow spindle portion 20b. The table 20 overlies the stationary ring 17 while the spindle 20b is disposed centrally within such ring.

For journaling the sub-table, a radial bearing 21 of the roller type is interposed between the spindle 20b and the inner surface of the wall 17b, such bearing including a plurality of tapered rollers 22 held between wedge-shaped inner and outer races 23a and 23b, non-rotatably secured respectively to the spindle 20b and the wall 17b. An anti-friction thrust bearing 24 is interposed between the underside of the table 20 and the upper surface 17c of the wall 17a, such bearing being here shown as a roller bearing including a plurality of rollers 25 interposed between upper and lower races 26a and 26b. The upper race 26a is secured in a recess 20c provided in the underside of the outer edge of the sub-table flange portion 20a. It will thus be seen that any forces due to the weight of the table 10 or a workpiece on it are transferred through the sub-table 20, the thrust bearing 24, the ring 17, and the partition 11b directly to the footing 11g of the base 11. Substantially no bending stresses are created in the base structure 11.

In accordance with an important feature of the invention, means are provided to effectively prevent rocking or wobbling of the sub-table 20 as it rotates about its vertical axis. Such rocking might be induced, for example, by relatively great cutting forces exerted by a tool acting at the outer edge of a workpiece supported on a table 10. If any play is present in the support of the sub-table 20, inaccuracies in the machined workpiece result.

As contemplated by the invention, this difficulty is obviated by means for preloading the radial bearing when it is assembled into the bearing unit 16. Such an arrangement as here illustrated includes an annular retaining collar 30 which is seated on the surface 17d of the inner wall 17b and extends radially inward to define an axial abutment for the outer race 23b. The retaining collar 30 may, for example, be held in place by a plurality of machine screws 31 which are tightened into threaded engagement with circumferentially spaced tapped openings in the wall 17b. Additionally, axially adjustable retaining means are located at the lower end of the spindle 20b to engage the inner race 22 and to shift the latter so that the radial bearing 21 is preloaded to the desired degree. Such means are embodied by a second annular retaining collar 32 which is fastened to the lower end of the spindle 20b by means of a plurality of machine screws 34 engaged in a corresponding plurality of circularly spaced tapped openings in the lower end of the spindle.

For adjusting the axial position of the retaining collar 32, a shim 35 of suitable thickness is interposed between it and the spindle. The retaining collar 32 extends radially outward to define an axial abutment for the outer race 22 and it will be apparent that upon tightening of the bolts 34 into firm engagement, the two races 22 and 23 are shifted axially relative to one another to place a preload on the radial bearing. With such a firm preloading of the radial bearing there is little or no freedom for the spindle to rock or wobble about a horizontal axis. Yet, with suitable lubrication for the radial bearing, the amount of friction caused by such preloading is negligible.

For rotatably driving the sub-table 20, the annular ring gear 15 seats at its inner edge in a recess 20d at the upper peripheral portion of the table. The ring gear is secured in place by a plurality of machine screws 40 threadably engaged in a corresponding spaced plurality of tapped openings. The downwardly extending portion of the ring gear 15 includes driving teeth which are meshed with the pinion 14 so that rotation of the shaft 12 by a suitable power source and transmission (not shown) rotates the sub-table 20 on the radial and thrust bearings 21 and 24.

It will be apparent that the ring gear 15 in this instance forms an extension for the top surface of the sub-table 20 and that the work table 10 is removably secured to this surface. As here illustrated, the work table 10 is of conventional construction including a plurality of T slots 10a, there being a plurality of fastening bolts 41 and 42 inserted through the floor of such T slots and into respective threaded engagement with tapped openings correspondingly located in the sub-table 20 and the ring gear 15. It will be understood that other types of work supports, such as a hydraulic chuck, may be fastened to the sub-table 20 in lieu of the table 10. The present table mount is admirably suited to accommodate hydraulic chucks since a hydraulic actuator may be disposed in a cylindrical housing 44 located centrally within the base 11, the shaft for such hydraulic actuator extending through the central opening defined by the spindle 20b.

From the foregoing description it will be apparent that the bearing unit 16 may be separately removed from or installed on the base 11 simply by loosening or tightening the fastening bolts 18. It is possible, therefore, to remove the table 10 first, and then remove the entire unit 16 which includes the ring gear 15, the sub-table 20, the radial and thrust bearings 21 and 24, the retaining rings 30 and 32 and the foundation ring 17. After such removal, an entirely new unit completely preassembled and with the radial bearing properly preloaded may be substituted. Repairs, adjustments, and assembly of the bearing unit 16 and its several components are thus facilitated.

To further enhance the removability of the bearing unit 16, an opening radially aligned with the screws 18 is provided in the sub-table flange portion 20a or the ring gear 15, as the case may be, permitting access to the bolts through such opening. As here illustrated, an opening 15a in the ring gear is radially alined with the bolts 18. Simply by inserting a screw driver or wrench through the opening 15a, the bolts 18 may be loosened or tightened to remove or install the ring 17 in seated relation on the surface 11e.

Through the employment of the ring 17 and means for preloading the radial bearing 21 for the spindle 20b, all misalinement of the worktable due to thermally induced expansion of the ring 17 by heat generated in the bearings is eliminated. Since the retaining collar 30 is free to shift radially of the outer race 23b, when the ring 17 becomes heated and the inner wall 17b expands axially, there is only a tendency to unload the radial bearing. This unloading, however, is not appreciable since the rollers 22 and the races 23a, 23b also expand to a similar degree thus substantially maintaining the original predetermined preloading created by tightening the retainer collar 32 against the shim 35. Expansion of the outer wall 17a axially does not distort the sub-table 20 since such expansion will be uniform around the wall and there is some freedom for the surface 17c to shift radially relative to the lower race 26b. Of more importance, however, are the effects of radial expansion. By making the foundation ring 17 with two concentric walls 17a and 17b, the former may be sufficiently large to support the weight of the table 10 (transferring it through the base partition 11b) while the latter may be relatively small, i. e., thin in a radial direction. As a result, heat generated in the bearing 21 rises the temperature of the relatively thin wall 17b rapidly, causing the latter to expand radially as the bearing does so that no binding in the bearing occurs. Moreover, the relatively isolated outer wall 17a remains cooler than the inner wall; it therefore does not expand appreciably in a radial direction, nor does it cause relative radial shifting of the races 26a, 26b with the attendant possibility of binding in the bearing 24. The entire arrangement, therefore, contributes to the elimination of table distortion and any inaccuracies in the machining of a workpiece which might result from such distortion.

I claim as my invention:

1. For use in a mount for a machine tool work support which is rotatable about a vertical axis, a preassembled and replaceable bearing unit comprising, in combination, a one-piece foundation ring having inner and outer upstanding annular concentric walls defining a downwardly opening annular groove therebetween and terminating in horizontal upper end surfaces, a sub-table overlying said ring and having a centrally depending spindle disposed within said ring, a roller bearing radially interposed between said ring and spindle and having a wedge-shaped outer race on the inner surface of said inner wall and a wedge-shaped inner race on said spindle, retaining means mounted on the upper surface of said inner wall and extending radially inward from said inner wall to define an axial abutment for said outer race, a retaining collar secured in axially adjustable relation on the lower end of said spindle to define an axial abutment for said inner race and afford selected preloading of said roller bearing, and a thrust bearing interposed between the underside of said table and the upper surface of said outer wall.

2. In a mount for the work support of a vertical turret lathe or the like, the combination comprising a one-piece foundation ring adapted to be seated on a base and having concentrically spaced inner and outer annular walls defining a downwardly opening annular groove therebetween, a sub-table overlying said ring and having a centrally depending spindle disposed within said ring, a radial roller bearing having a wedge-shaped inner race on said spindle and a wedge-shaped outer race on the inner surface of said inner wall, a thrust bearing interposed between the underside of said sub-table and the upper end of said outer wall, and axially adjustable retaining collars secured respectively to the upper end of said inner wall and the lower end of said spindle to provide preloading axial abutments for said outer and inner races.

3. In an anti-friction mount for journaling an annular sub-table having a depending hollow spindle portion for rotation above a vertical axis relative to a base having an annular vertical partition presenting at its upper end a flat horizontal surface, the combination comprising, a one-piece foundation ring having a lower portion including a radial flange and having inner and outer concentric vertically upright walls defining an annular groove therebetween, said ring having its lower portion seated on and secured to the horizontal surface of said partition with said outer wall directly above said partition, said walls having flat, horizontal, coplanar upper surfaces, said sub-table being disposed in overlying relation to said ring with said spindle portion depending therethrough, a radial tapered roller bearing having a wedge-shaped inner race disposed around said spindle portion and a wedge-shaped outer race concentrically within and fast on the inner surface of said inner wall, an anti-friction axial thrust bearing interposed between the underside of said sub-table and the upper surface of said outer wall, a first retainer collar secured to the upper surface of the inner wall and extending radially inward for axial engagement with said outer race, a second retainer collar secured to the lower end of said spindle portion and extending radially outward for axial engagement with said inner race, and means for adjusting said second retaining ring axially of said spindle to preload said roller bearing.

4. In an anti-friction mount for journaling an annular sub-table having a central depending spindle for rotation about a vertical axis relative to a base having an annular, vertical partition presenting a horizontal upper surface, the combination comprising a one-piece foundation ring having inner and outer concentric annular vertical walls defining a downwardly opening annular groove therebetween and terminating in coplanar horizontal upper surfaces, said sub-table being disposed in overlying relation to said ring with said spindle projecting therethrough, a roller bearing radially interposed between said spindle and ring and having a wedge-shaped inner race non-rotatably fixed on said spindle and a wedge-shaped outer race non-rotatably fixed to said inner wall, a thrust bearing interposed between the underside of said sub-table and the upper surface of said outer wall, a first retainer collar secured to the upper surface of said inner wall and forming an axial abutment for said outer race, a second retainer collar secured to the lower end of said spindle and forming an axial abutment for said inner race, means for adjusting said second retainer collar axially of said spindle to preload said roller bearing, and means for removably securing said ring in seated relation on the upper surface of said base partition, the forces on said thrust bearing due to weight placed on said sub-table being transferred through said ring to said partition.

5. In an anti-friction mount for journaling a machine tool sub-table having a central depending spindle for rotation about a vertical axis relative to a base including a footing and an upstanding annular partition terminating in an upper horizontal surface, the combination comprising a foundation ring seated on said surface directly above said partition, said sub-table being disposed to overlie said ring with its depending spindle projecting therethrough, a radial roller bearing having wedge-shaped inner and outer races interposed between said ring and spindle, retaining means on the top of said ring and the bottom of said spindle adjustable relatively in a vertical direction to preload said roller bearing, a thrust bearing interposed between the underside of said table and the top of said ring in vertical alinement with said partition, the weight of a work support and work placed on said sub-table thereby being transferred through said thrust bearing, ring and partition directly to said footing.

6. The combination set forth in claim 5 further characterized in that bolts are passed through said radial flange on said foundation ring to secure it to said partition surface, there being at least one vertical opening in said sub-table radially alined with said bolts and through which a tool may be passed to loosen or tighten said bolts.

References Cited in the file of this patent

UNITED STATES PATENTS

| | | |
|---|---|---|
| 2,183,362 | Zimmermann et al. | Dec. 12, 1939 |
| 2,605,656 | Daugherty | Aug. 5, 1952 |
| 2,643,920 | Olszewski | June 30, 1953 |
| 2,680,658 | Addison | June 8, 1954 |
| 2,699,695 | Addison | Jan. 18, 1955 |
| 2,708,861 | Walter | May 24, 1955 |